(12) United States Patent
Varghese

(10) Patent No.: US 8,972,325 B2
(45) Date of Patent: Mar. 3, 2015

(54) ROLE BASED IDENTITY TRACKER

(75) Inventor: Thomas Varghese, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 648 days.

(21) Appl. No.: 12/496,598

(22) Filed: Jul. 1, 2009

(65) Prior Publication Data

US 2011/0004580 A1 Jan. 6, 2011

(51) Int. Cl.
*G06N 99/00* (2010.01)
*G06Q 30/02* (2012.01)

(52) U.S. Cl.
CPC .............. *G06N 99/005* (2013.01); *G06Q 30/02* (2013.01)
USPC ......................................................... 706/47

(58) Field of Classification Search
CPC ....... G06N 5/04; G06N 5/025; G06N 99/005; G06Q 10/10
USPC .......................................... 706/47, 46, 45, 62
See application file for complete search history.

(56) References Cited

U.S. PATENT DOCUMENTS

| | | | |
|---|---|---|---|
| 5,627,886 A * | 5/1997 | Bowman ........................ | 379/111 |
| 6,769,066 B1 * | 7/2004 | Botros et al. ..................... | 726/23 |
| 7,290,288 B2 | 10/2007 | Gregg et al. | |
| 7,395,507 B2 | 7/2008 | Robarts et al. | |
| 2002/0099649 A1 * | 7/2002 | Lee et al. ......................... | 705/38 |
| 2002/0174030 A1 * | 11/2002 | Praisner et al. .................. | 705/26 |
| 2005/0086529 A1 * | 4/2005 | Buchsbaum .................. | 713/201 |
| 2005/0278192 A1 * | 12/2005 | Cantini et al. ..................... | 705/1 |
| 2005/0283608 A1 | 12/2005 | Halcrow et al. | |
| 2007/0073519 A1 * | 3/2007 | Long .............................. | 702/185 |
| 2007/0124579 A1 * | 5/2007 | Haller ............................ | 713/156 |
| 2007/0220604 A1 * | 9/2007 | Long .............................. | 726/22 |
| 2008/0046334 A1 * | 2/2008 | Lee et al. ......................... | 705/26 |
| 2008/0133386 A1 * | 6/2008 | Darvish et al. .................. | 705/30 |
| 2008/0147790 A1 * | 6/2008 | Malaney et al. .............. | 709/203 |

(Continued)

FOREIGN PATENT DOCUMENTS

WO 2004075036 A1 9/2004

OTHER PUBLICATIONS

Alves et al, "Discovering Telecom Fraud Situations through Mining Anomalous Behavior Patterns", DMBA'06, Aug. 20, 2006, Philadelphia, Pennsylvania, USA, 2006.*

(Continued)

*Primary Examiner* — Jeffrey A Gaffin
*Assistant Examiner* — Ilya Traktovenko
(74) *Attorney, Agent, or Firm* — Trellis IP Law Group, PC

(57) ABSTRACT

Particular embodiments use roles to determine anomalies in a user's behavior. Different roles may be defined for a business. For example, users that have similar job responsibilities are grouped in a role. Behavior information is then monitored for the plurality of users in the role. This may include transactions or other actions taken by the user. Over time, a profile can be generated for the user based on the monitored behavior. This profile learns the user's behavior. Information for the user's behavior may then be compared to other users' profiles in the same role to determine anomalies in the user's behavior over time. For example, when differences in activities occur for a user as compared to other users with the same role, a message may be generated that indicates that there may be an anomaly in the user's behavior. This alert may then be output.

20 Claims, 4 Drawing Sheets

(56) References Cited

U.S. PATENT DOCUMENTS

2009/0292743 A1* 11/2009 Bigus et al. .................. 707/202
2009/0293121 A1* 11/2009 Bigus et al. .................... 726/22

OTHER PUBLICATIONS

Lane et al, "Sequence Matching and Learning in Anomaly Detection for Computer Security", From: AAAI Technical Report WS-97-07, 1997, AAAI.*

Lane et al, "Temporal Sequence Learning and Data Reduction for Anomaly Detection", ACM Transactions on Information and System Security, vol. 2, No. 3, Aug. 1999.*

Yin et al, "A New Intrusion Detection Method Based on Behavioral Model", Proceedings of the 5'World Congress on Intelligent Control and Automation, Jun. 15-19, 2004. Hangzhou. P.R. China.*

Bolton et al, "Peer Group Analysis—Local Anomaly Detection in Longitudinal Data", Technical report, Department of Mathematics, Imperial College, London, UK, 2001.*

Jun, "A Peer Dataset Comparison Outlier Detection Model Applied to Financial Surveillance", 18th International Conference on Pattern Recognition, 2006, ICPR 2006.*

Moore, Andrew P., et al.; Software Engineering Institute "The 'Big Picture' of Insider IT Sabotage Across U.S. Critical Infrastructures", Technical Report CMU/SEI-2008-TR-009, Carnegie Mellon; May 2008; 46 pages.

Preventive Security obtained at http://freshmeat.net/articles/view/434/; 20 pages.

Saraydaryan, Jacques, et al.; "Behavioral Intrusion Detection Indicators" obtained at http://www.springerlink.com/content/b320vk62278q1472/; 15 pages.

Bhatti, Rafae, et al.; "A Trust-based Context-Aware Access Control Model for Web-Services" obtained at http://yamashita2.computer.org/persagen/DLAbsToc.jsp?resourcePath=/dl/proceedings/&toc=comp/proceedings/icws/2004/2167/00/2167toc.xml&DOI=10.1109/ICWS.2004.1314738; 8 pages.

Ying, Chen, et al.; "Design and Implementation of Dynamic-Role Based Access Control Framework in Grid Environment" obtained at http://www2.computer.org/portal/web/csdl/doi/10.1109/ITCC.2005.121; 2 pages.

Yialelis, N., et al., "Role-based Security for Distributed Object Systems" obtained at http://yamashita2.computer.org/persagen/DLAbsToc.jsp?resourcePath=/d/proceedings/&toc=comp/proceedings/wetice/1996/7445/00/7445toc.xml&DOI=10.1109/ENABL.1996.555078; 6 pages.

Oracle Identity Manager, An Oracle White Paper, Oracle Fusion Middleware; Dec. 2008, 14 pages.

* cited by examiner

ROLE BASED IDENTITY TRACKER

BACKGROUND

Particular embodiments generally relate to identity tracking.

There have been many problems that have resulted in crises. For example, mortgage fraud has hurt the housing and real estate industries. Financial fraud has also hurt countless numbers of people in addition to the financial industry. There have been many other different types of fraud that have caused problems in the world.

A lack of solutions exists to detect fraud efficiently. Some existing business applications delegate the policing responsibility to solutions that rely on authentication, authorization, and policies including audit and compliance measures that are reactive in nature. These methods all assume that human beings can be policed. Systems put policies in place with rules that are created by humans in the first place. Because these policies are created by humans, humans can devise ways within and around the rules to beat the system without violating the authentications, authorizations, or pre-defined policies. Individual analysis is an unsupervised method for monitoring behavior over time. These techniques could be used to find anomalous transactions, which are transactions that deviate strongly from the individual's behavior and are flagged as potentially fraudulent. But again humans can beat this system easily knowing perfectly well how these systems are modeled and still rely on past behavior. Thus, fraud may not be detected in time to lessen the impact.

SUMMARY

Particular embodiments use roles to determine anomalies in a user's behavior. Different roles may be defined for a business. For example, users that have similar job responsibilities are grouped in a role. For example, all loan processors may be assigned a loan processor role. Behavior information is then monitored for the plurality of users in the role. This may include transactions or other actions taken by the user. Over time, a profile can be generated for the user based on the monitored behavior. This profile learns the user's behavior. Information for the user's behavior may then be compared to other users' profiles in the same role to determine anomalies in the user's behavior over time. For example, when differences in activities occur for a user as compared to other users with the same role, a message may be generated that indicates that there may be an anomaly in the user's behavior. These are transactions that deviate strongly from their peer group and are flagged as potentially fraudulent. This alert may then be output.

In one embodiment, a method is provided comprising: defining a role for an entity; associating a plurality of users to the role in the entity; monitoring behavior information for the plurality of users; generating a profile for each user based on each users' monitored behavior; comparing information for a user's behavior with profiles of other users associated with the role; and generating a message based on the analysis, the message indicating an anomaly in the user's behavior with respect to other users' behavior within the role.

In another embodiment, a computer-readable storage medium is provided comprising encoded logic for execution by the one or more computer processors, the logic when executed is operable to: define a role for an entity; associate a plurality of users to the role in the entity; monitor behavior information for the plurality of users; generating a profile for each user based on each users' monitored behavior; compare, using the one or more computer processors, information for a user's behavior with profiles of other users associated with the role; and generate, using the one or more computer processors, a message based on the analysis, the message indicating an anomaly in the user's behavior with respect to other users' behavior within the role.

In yet another embodiment, an apparatus is provided comprising: one or more processors; and logic encoded in one or more computer readable media for execution by the one or more computer processors and when executed operable to:

define a role for an entity; associate a plurality of users to the role in the entity; monitor behavior information for the plurality of users; generating a profile for each user based on each users' monitored behavior; compare, using the one or more computer processors, information for a user's behavior with profiles of other users associated with the role; and generate, using the one or more computer processors, a message based on the analysis, the message indicating an anomaly in the user's behavior with respect to other users' behavior within the role.

A further understanding of the nature and the advantages of particular embodiments disclosed herein may be realized by reference of the remaining portions of the specification and the attached drawings.

DETAILED DESCRIPTION OF EMBODIMENTS

Figure 1:
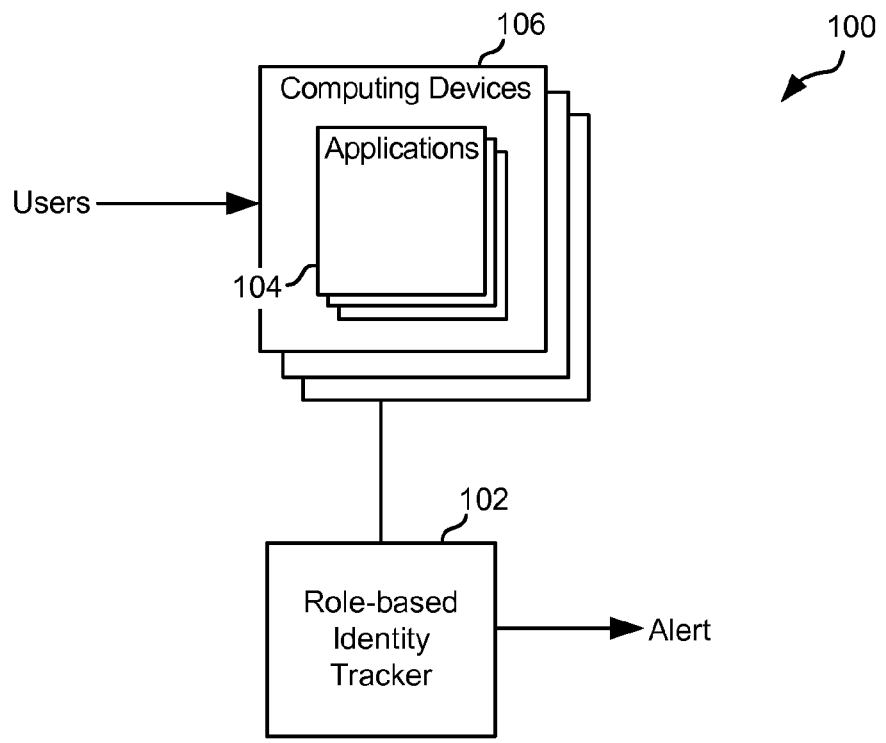
FIG. 1 depicts a simplified system for monitoring users based on roles according to one embodiment.

FIG. 1 depicts a simplified system 100 for monitoring users based on roles according to one embodiment. As shown, system 100 includes a plurality of users, a plurality of applications 104, and a role-based identity tracker 102. Applications 104 may be found on one or more computing devices 106. Other devices and users may be provided in system 100 but are not shown for simplicity purposes.

Users may be associated with an organization or business. For example, the users may be employees of a company. Also, the users may be members of an organization, such as a political organization. The term entity may be used herein to represent these examples. It will be understood that an entity may be any relationship among users. In one embodiment, the users do not have to be members of the same business. Rather, users across different companies may be compared as an entity. Any users that may be associated with a role may form an entity.

Applications 104 may be any applications or platforms that users interact with. The applications may be internal business applications, web services, or web service-enabled business applications where workflow and collaboration processes across the applications are monitored. Also, in other embodiments, applications 104 may be applications that a user may personally use, such as personal banking applications. These personal applications may be accessed while a user is using a business computer such that these transactions can be monitored. In other embodiments, tracking agents may be downloaded to a user's personal computer to monitor the transactions.

The transactions that a user performs with applications 104 may be monitored. Information about the transactions may be gathered and downloaded to role-based identity tracker 102. Role-based identity tracker 102 may be part of a system or platform (e.g., one or more computing devices) that monitors users for anomalous behavior.

Figure 2:
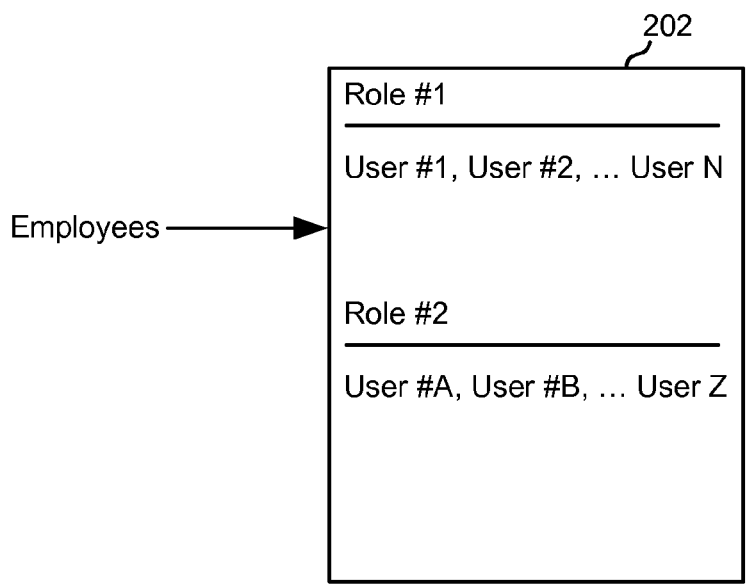
FIG. 2 shows the categorization of roles according to one embodiment.

Role-based identity tracker 102 uses the concept of roles to determine anomalies in behavior. The role may be defined by a user or automatically. FIG. 2 shows the categorization of roles according to one embodiment. Roles are selected such that users within the role are expected to perform similar transactions. All or a portion of employees for an entity may be considered. Each employee may be categorized in one or more roles. Different methods for categorizing the employee base into roles may be used. For example, the title in an organization may be used to leverage the fact that businesses may have already classified users in different departments and titles. Also, roles may be defined across departments. For example, vice presidents for all departments may be defined in a role.

As shown in FIG. 2, different user IDs may be associated with roles in a data structure. A role #1 includes identifiers for user 1, user 2, . . . , user N. A role #2 includes identifiers for a user A, user B, and user Z. A data structure may be generated that associates different users with roles. Identifiers, such as user names or other identifying information may be associated with different roles.

Referring back to FIG. 1, role-based identity tracker 102 then monitors information for the users of the same role over time. A profile may be built for each user using the information. The amount of time may vary. For example, an amount of time may be set such that a user's behavior may be reliably learned. That is, the profile can reasonably ascertain what behavior is normally taken by users. Once it is determined the profiles define the user's behavior reliably, the users' profiles within the same role may be compared to determine if any anomalies exist. For example, the profiles are analyzed to determine if transactions fall outside of the usual behavior of other users' with the same role. When an anomaly is detected, an alert may be generated.

By learning a user's behavior over time, different profiles are built and the profiles may change over time. The anomalies are detected by using the profiles. This may not involve setting rules where a user's behavior is compared to each rule. When rules are used, users may devise ways for avoiding detection by the rules and alerting a system of potentially devious behavior. However, by learning the behavior of a user over time and then comparing the user's behavior to other user's behavior in the same role, anomalies of how a user is behaving with respect to other users may be detected. This may rely on the concept that most users are behaving in the correct way. However, a small percentage of users may be behaving in a fraudulent way. Building a profile over time defines the desirable behavior for a role as the behavior is learned. When an anomaly in behavior for a user in the role is detected, then an alert may be generated. It is expected that because the role is generated based on a user's behavior over time and not human-generated rules, the anomaly that is detected may be more accurate and also makes it harder for a user to avoid detection of bad behavior.

One basic assumption is that in large enterprises, organizational processes may require multiple individuals to perform a certain business role. For example, mortgage consultants, loan processors, procurement managers, and client advisors, etc., may perform a certain set of tasks. Thus, if a certain set of individuals processing loans of certain types targeting certain customers within a certain geographic area compared to other colleagues, these users should perform these same tasks. Also, a certain procurement manager may authorizes purchases within a certain amount to avoid further approvals or placing orders through the same provider irrespective of prices. Thus, abnormal behavior may be detected by analyzing the behavior of other users within the role. Thus, fraudulent types of behavior are not defined. Rather, abnormal behavior in the role is flagged and it can be determined if this behavior constitutes fraud.

Figure 3:
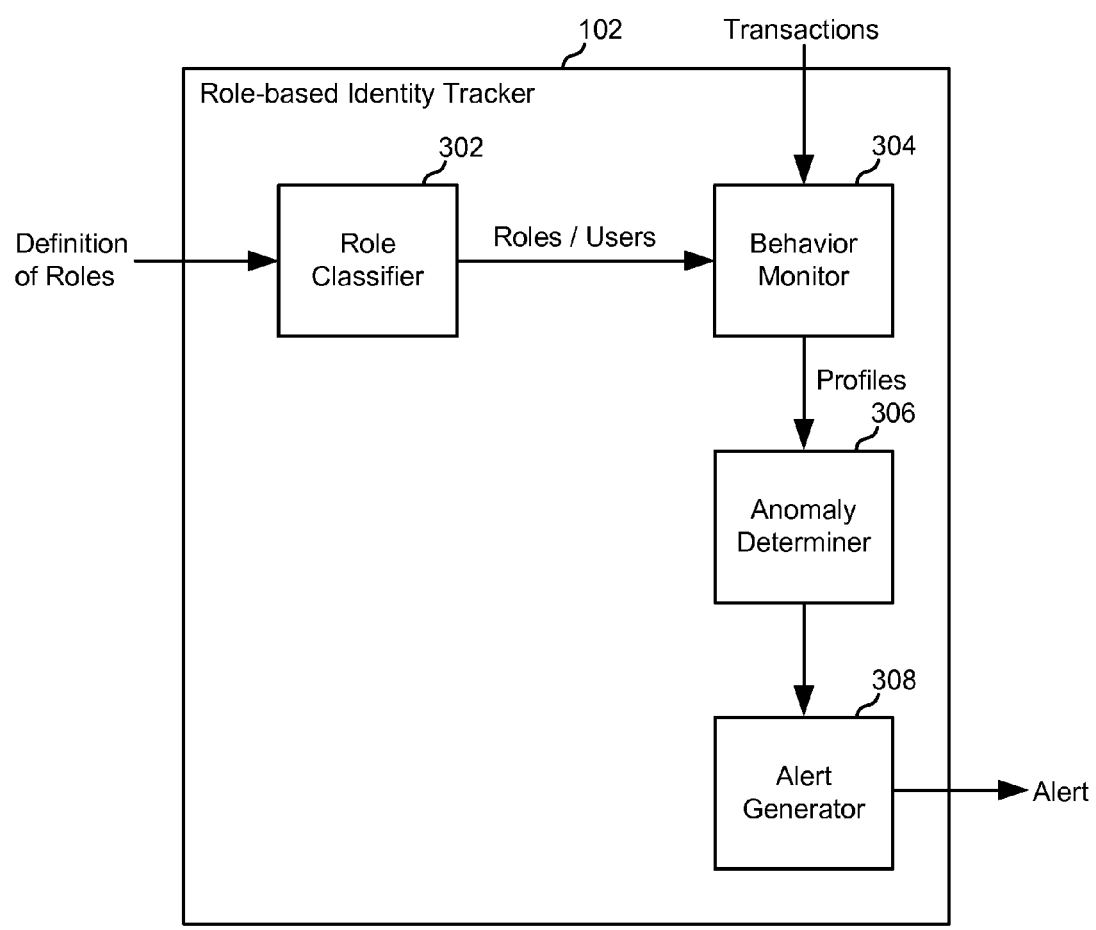
FIG. 3 depicts a more detailed example of a role-based identity tracker according to one embodiment.

FIG. 3 depicts a more detailed example of role-based identity tracker 102 according to one embodiment. Role-based identity tracker 102 may be implemented using a programmed computer for identity tracking. Logic may be encoded in one or more tangible media for execution by the one or more processors. The components of role-based identity tracker 102 may cause the computer to perform the functions described herein.

A role classifier 302 receives the definition of roles, which assign users to different roles. Role classifier 302 may define how different users may be monitored. For example, settings for different monitoring applications may be provided to monitor different user IDs.

A behavior monitor 304 monitors activity by different users. Various collaboration and monitoring software may be used. The activity may be any transactions that users participate in with applications 104. The activity may be within the entity or outside the entity. For example, e-mail messages may be monitored within the entity using an enterprise e-mail server. Also, a user's personal e-mail accounts may be monitored.

Behavior monitor 304 is configured to receive transactions for different individuals and build profiles. The profiles that are built are learned over time. These profiles may be generated by analyzing activity by each user. For example, for a user, the activity may indicate that the user performs certain tasks within a business application with certain transaction values, such as purchase orders are usually performed within a certain range of values. As these orders are performed, the profile indicates that this user performs purchases orders over the range of values.

Once the profiles are generated, an anomaly determiner 306 generates alerts for behavior anomalies that are detected. Anomaly determiner 306 can compare profiles of users in the same role. This comparison identifies behavior that may be an anomaly for that role. For example, a user that may have behaved differently from other people in the same role may indicate that this behavior may be fraudulent. In one embodiment, this relies on the fact that only a small percentage (e.g., <0.001%) of users in a certain role may behave fraudulently within the business application as compared to other users within that same role. Because over time the behavior of other users is learned and used to generate a profile, the user that has behavior that is an anomaly as compared to other users' behavior is flagged. By using the behavior of other users in the same role, a user may not be able to avoid detection. This is because the user would not know rules that are being used to detect the anomalous behavior. Rather, the behavior that is analyzed is how most users act within the role in what is considered a righteous manner.

In another embodiment, transactions may be analyzed in real-time. For example, as the transactions are being performed by users, they are analyzed for anomalies. Also, these transactions may be analyzed at a later time, such as daily, weekly, or monthly. Also, it should be noted that the transactions that are being analyzed would also be used to generate the profiles that are ongoing.

Different aspects of the data may be flagged, such as time-based anomalies, location-based anomalies, and activity-based anomalies. Thresholds may be used to determine an anomaly. For example, when data indicates a pattern that is different from what is considered normal behavior from a predefined amount, the data may be flagged as abnormal.

An alert generator 308 then generates a message that indicates an anomaly has been founded. For example, an alert may be generated and sent to an evaluator. The evaluator may then analyze whether or not the anomaly that has been detected is actionable. Also, the user may be flagged as having possible bad behavior and may be monitored more closely.

Figure 4:
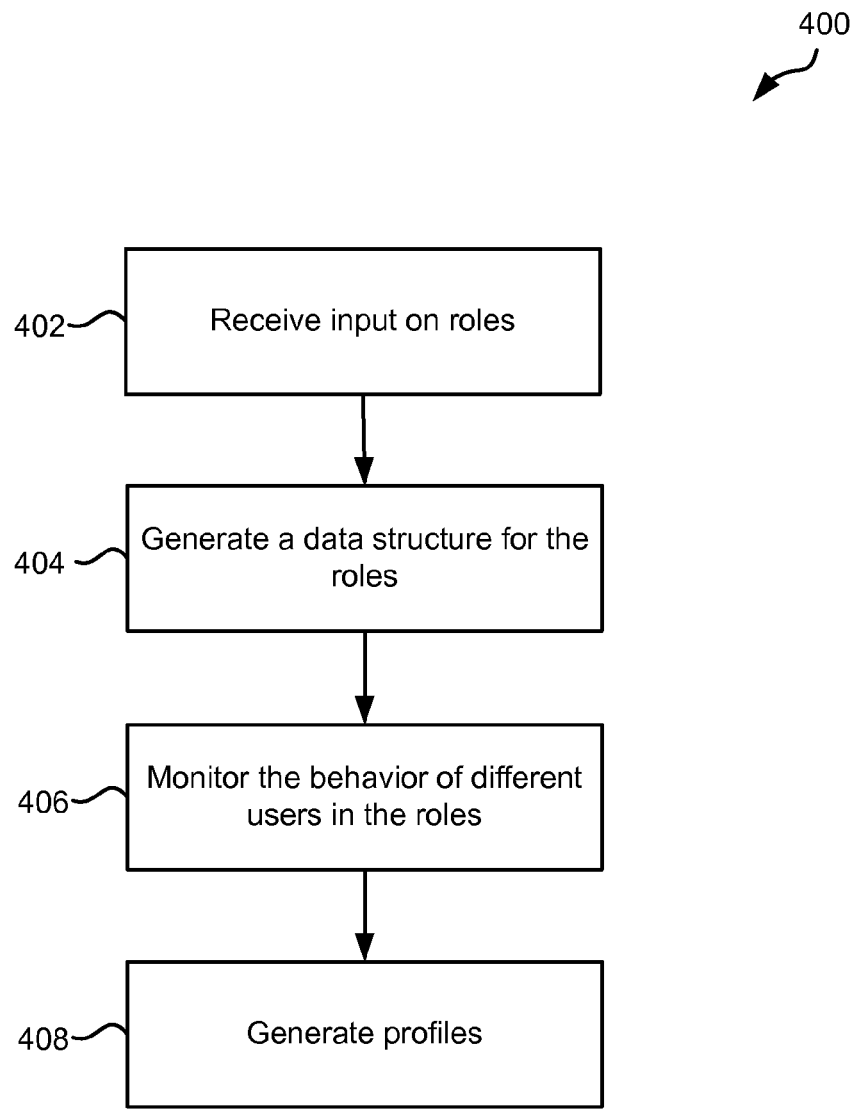
FIG. 4 depicts a simplified flowchart of a method for generating profiles according to one embodiment.

FIG. 4 depicts a simplified flowchart 400 of a method for generating profiles according to one embodiment. FIG. 4 may be performed by role-based identity tracker 102. Step 402 receives input on roles. For example, different user identifiers may be received for different roles. Step 404 then generates a data structure for the roles. This assigns different user identifiers to the roles.

Step 406 then monitors the behavior of different users in the roles. As different behavior is monitored, profiles may be generated in step 408. These profiles may be continually modified as more information is received.

Figure 5:
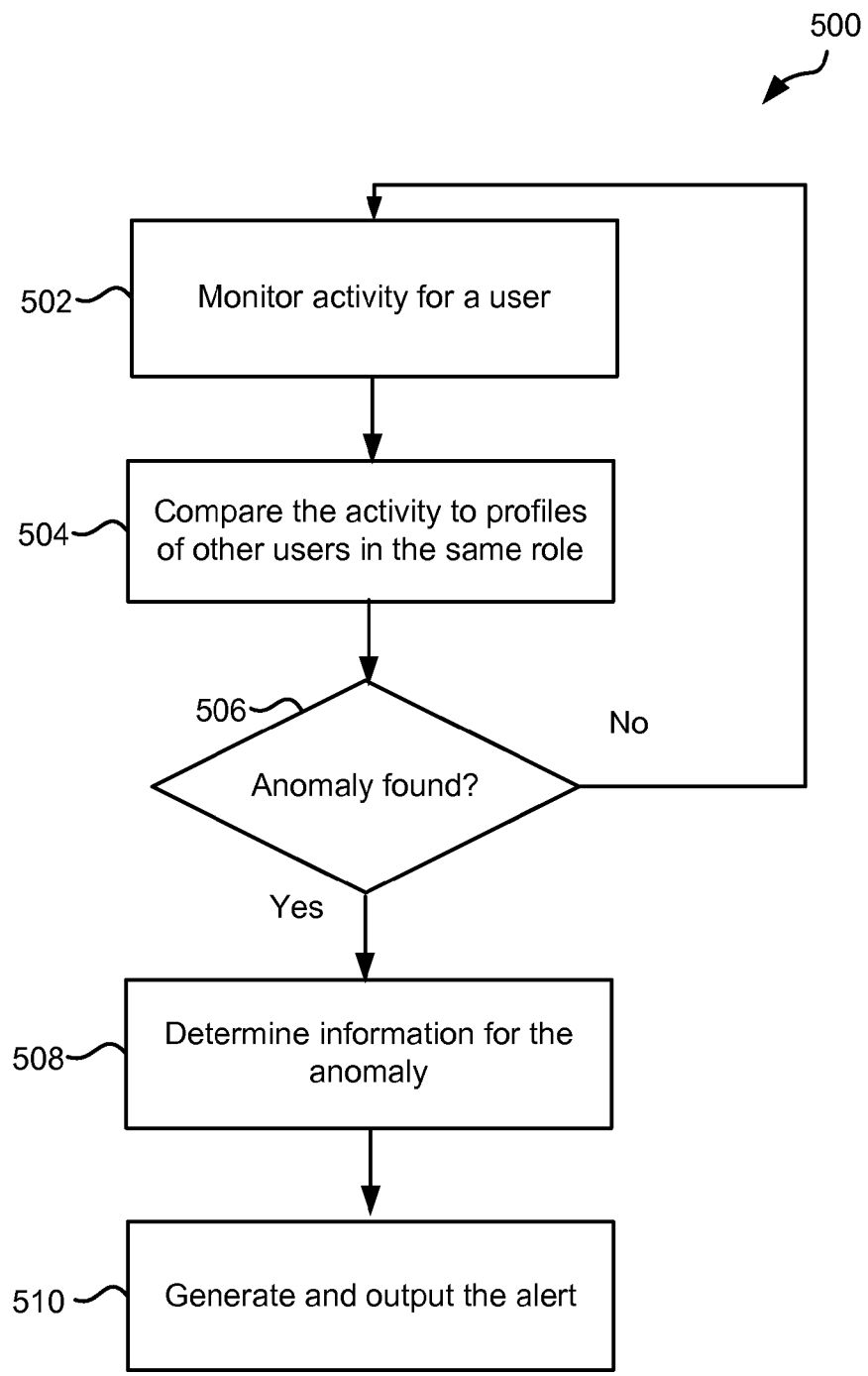
FIG. 5 depicts a simplified flowchart for outputting alerts according to one embodiment.

FIG. 5 depicts a simplified flowchart 500 for outputting alerts according to one embodiment. FIG. 5 may be performed using role-based identity tracker 102.

Step 502 monitors activity for a user. The profiles that are built may be analyzed for anomalies. The profiles may be based on a large portion of activities that have been monitored over time. Also, the monitored activity may be new activity that has been received. For example, it may be desirable to analyze more recent activity such that behavior anomalies may be detected faster.

Step 504 compares the activity to profiles of other users in the same role. The comparison may be performed in different ways. For example, the differences in activities, such as time-based activities, location-based activities, or other activities may be used. For example, time-based anomalies may flag potential users that process transactions at different times. A user may tend to work odd hours such as very early, late or even on weekends to avoid detection. This may allow the user to avoid detection from other office colleagues. Thus, if most users process transactions during business hours, but the targeted user is performing transactions after 6:00 p.m., this may flag an anomaly within the same role. Conventionally, this may not have been flagged because other users in the entity may have been processing transactions at that time. However, these users may be in another role where these transactions should be processed at that time. Thus, by comparing users in the same role, a more accurate detection of anomalies may be provided.

Activity-based anomalies may flag users who perform certain tasks within their business application with transaction values that may not be typical with other users in the same role. For example, purchase orders below a certain value from the same vendor to avoid a secondary audit may be performed where other users are processing loans with much higher values to the same target audience. By comparing activities for users in the same role, it may be expected that activities should be fairly similar.

Step 506 determines if an anomaly is found. If not, the process reiterates to step 502 to continue monitoring.

If an anomaly is found, step 508 determines information for the anomaly. For example, the type of anomaly and the information relied on to detect the anomaly may be summarized.

Step 510 generates and outputs the alert. The alert may be displayed for a user to review. Also, the alert may be sent to another user for review and other methods of outputting the alert may be used.

Particular embodiments provide many advantages. For example, existing types and new types of fraud may be detected. The detection is determined without rules such that the type of fraud does not need to be defined by the system. Each user's behavior may be used to define which anomalies may be detected. Thus, the system does not need to know that performing transactions at a certain time constitutes fraud. Rather, by the fact that most users are not committing fraud and performing the transactions at the right time, role-based identity tracker 202 can detect an anomaly in behavior. This moves fraud detection from a rule-based system to a role-based system. The system may also deter fraud by providing a real-time view into the behavior of the users from a role-centric perspective. This approach proactively detects misuse of predefined responsibilities within the existing frameworks of security, audit, and compliance. This is also simplified by not having to define which responsibilities each user should be performing.

Although the description has been described with respect to particular embodiments thereof, these particular embodiments are merely illustrative, and not restrictive. Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method to detect fraudulent behavior, performed by one or more processors, comprising:
    associating, using the one or more processors, a plurality of users having similar job responsibilities with a common role in a business entity, with the plurality of users performing a certain set of business-related tasks related to the similar job responsibilities, where users performing the certain set of business-related tasks are authorized to perform similar role-related transactions using common web service enabled business applications;
    monitoring, using the one or more processors, workflow and collaboration processes across the common web service enabled business applications used by the plurality of users associated with the common role when performing the similar role-related transactions;
    receiving specific individual activities over time that are uniquely associated with each of the user's individual performance of the certain set of business-related tasks related to the common role;
    in response to the specific individual activities for each user, generating, using the one or more processors, a role profile for each user in the plurality of users associated with the common role, wherein the role profile associated with each user represents behaviors that are unique and vary according to each user performing the certain set of business-related tasks;
    comparing, using the one or more processors, the role profiles of the plurality of users associated with the common role to identify behavioral differences between the plurality of users performing the certain set of business-related tasks related to the common role;
    determining, using the one or more processors, a presence of anomalous behavior by analyzing the behavioral differences between the plurality of users to determine whether the behavioral differences represent anomalous behavior with respect to the common role; and
    outputting, using the one or more processors, an alert in response to determining the behavioral differences represent anomalous behavior.

2. The method of claim 1 wherein comparing occurs concurrently with monitoring.

3. The method of claim 1 wherein the common role is a business role required by the entity to be performed by the plurality of users.

4. The method of claim 3 where the business role is processing loans of a certain type and where the certain set of tasks relate to processing loans.

5. The method of claim 3 where the business role is procurement manager and where the certain set of tasks relate authorizing purchases of a certain type.

6. The method of claim 1 wherein monitoring further includes concurrently monitoring workflow and collaboration processes for the plurality of users during a common interval of time.

7. The method of claim 1 wherein the anomalous behavior comprises an activity-based anomaly that is determined to be different from profiled activity for each of the plurality of users.

8. A non-transitory computer-readable storage medium comprising encoded logic for execution by the one or more computer processors, the logic when executed is operable to:
    associate a plurality of users having similar job responsibilities with a common role in a business entity, with the plurality of users performing a certain set of business-related tasks related to the similar job responsibilities, where users performing the certain set of business-related tasks are authorized to perform similar role-related transactions using common web service enabled business applications;
    monitor workflow and collaboration processes across the common web service enabled business applications used by the plurality of users associated with the common role when performing the similar role-related transactions;
    receive specific individual activities over time that are uniquely associated with each of the user's individual performance of the certain set of business-related tasks related to the common role;
    in response to the specific individual activities for each user, generate a role profile for the plurality of users associated with the common role, wherein the role profile associated with each user represents behaviors that are unique and vary according to each user performing the certain set of business-related tasks;
    compare the role profiles of the plurality of users associated with the common role to identify behavioral differences between the plurality of users performing the certain set of business-related tasks related to the common role;
    determine a presence of anomalous behavior by analyzing the behavioral differences between the plurality of users to determine whether the behavioral differences represent anomalous behavior with respect to the common role; and
    output an alert in response to determining the presence of the anomalous behavior.

9. The non-transitory computer-readable storage medium of claim 8 wherein logic operable to monitor behavior comprises logic operable to monitor the workflow and collaboration processes concurrently with comparing users' profiled for anomalous behavior.

10. The non-transitory computer-readable storage medium of claim 8 wherein the common role is a business role required by the entity to be performed by the plurality of users.

11. The non-transitory computer readable medium of claim 10 where the business role is processing loans of a certain type and where the certain set of tasks relate to processing loans.

12. The non-transitory computer readable medium of claim 10 where the business role is procurement manager and where the certain set of tasks relate authorizing purchases of a certain type.

13. The non-transitory computer-readable storage medium of claim 8 wherein logic operable to monitor comprises logic operable to concurrently monitor workflow and collaboration processes of the plurality of users during a common interval of time.

14. The non-transitory computer-readable storage medium of claim 8 wherein the anomalous behavior comprises an activity-based anomaly that is determined to be different from profiled activity for each of the plurality of users.

15. The non-transitory computer-readable storage medium of claim 8 further including logic operable to terminate the logic operable to monitor and to compare users' profiles to determine anomalous behavior after the logic operable to monitor has terminated.

16. The non-transitory computer-readable storage medium of claim 15 wherein logic operable to compare operates following an interval of time after the logic operable to monitor has terminated.

17. An apparatus comprising:
one or more processors; and
logic encoded in one or more non-transitory computer readable storage media for execution by the one or more computer processors and when executed operable to:
associate a plurality of users having similar job responsibilities with a common role in a business entity, with the plurality of users performing a certain set of business-related tasks related to the similar job responsibilities, where users performing the certain set of business-related tasks are authorized to perform similar role-related transactions using common web service enabled business applications;
monitor workflow and collaboration processes across the common web service enabled business applications used by the plurality of users associated with the common role when performing the similar role-related transactions;
receive specific individual activities over time that are uniquely associated with each of the user's individual performance of the certain set of business-related tasks related to the common role;
in response to the specific individual activities for each user, generate a role profile for the plurality of users associated with the common role, wherein the role profile associated with each user represents behaviors that are unique and vary according to each user performing the certain set of business-related tasks;
compare the role profiles of the plurality of users associated with the common role to identify behavioral differences between the plurality of users performing the certain set of business-related tasks related to the common role;
determine a presence of anomalous behavior by analyzing the behavioral differences between the plurality of users to determine whether the behavioral differences represent anomalous behavior with respect to the common role; and
output an alert in response to determining the presence of the anomalous behavior.

18. The apparatus of claim 17 wherein logic operable to monitor comprises logic operable to monitor concurrently workflow and collaboration processes with comparing users' profiles for anomalous behavior.

19. The apparatus of claim 17 where the common role is a business role required by the entity to be performed by the plurality of users.

20. The apparatus of claim 19 where the business role is processing loans of a certain type and where the certain set of tasks relate to processing loans.

* * * * *

UNITED STATES PATENT AND TRADEMARK OFFICE
CERTIFICATE OF CORRECTION

PATENT NO.        : 8,972,325 B2                                Page 1 of 1
APPLICATION NO.   : 12/496598
DATED             : March 3, 2015
INVENTOR(S)       : Varghese It is certified that error appears in the above-identified patent and that said Letters Patent is hereby corrected as shown below:

References Cited
On page 2, column 2, under Other Publications, line 19, delete "/d/" and insert -- /dl/ --, therefor.

In the specification
In column 2, line 9, delete "computer readable" and insert -- computer-readable --, therefor.

In the claims
In column 8, line 58, in Claim 11, delete "computer readable" and insert -- computer-readable storage --, therefor.

In column 8, line 62, in Claim 12, delete "computer readable" and insert -- computer-readable storage --, therefor.

In column 9, lines 19-20, in Claim 17, delete "computer readable" and insert -- computer-readable --, therefor.

Signed and Sealed this
Thirteenth Day of October, 2015

Michelle K. Lee
*Director of the United States Patent and Trademark Office*